United States Patent
Sasada

(10) Patent No.: US 8,257,621 B2
(45) Date of Patent: Sep. 4, 2012

(54) TRANSPARENT POLYMER FILM AND METHOD FOR PRODUCING IT, AND RETARDATION FILM, POLARIZER AND LIQUID CRYSTAL DISPLAY DEVICE COMPRISING THE FILM

(75) Inventor: Yasuyuki Sasada, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1049 days.

(21) Appl. No.: 12/278,335

(22) PCT Filed: Feb. 22, 2007

(86) PCT No.: PCT/JP2007/053861
§ 371 (c)(1),
(2), (4) Date: Aug. 5, 2008

(87) PCT Pub. No.: WO2007/100025
PCT Pub. Date: Sep. 7, 2007

(65) Prior Publication Data
US 2011/0194051 A1    Aug. 11, 2011

(30) Foreign Application Priority Data

Feb. 22, 2006    (JP) .................. 2006-044733

(51) Int. Cl.
B29D 7/01 (2006.01)
B29C 71/00 (2006.01)
G02F 1/1335 (2006.01)
C09K 19/00 (2006.01)

(52) U.S. Cl. ......... 264/1.34; 264/1.6; 264/2.6; 264/231; 264/235; 264/235.6; 264/288.4; 264/289.3; 264/290.2; 349/96; 349/117; 428/1.31; 428/1.33

(58) Field of Classification Search ........................ None
See application file for complete search history.

(56) References Cited

U.S. PATENT DOCUMENTS

| | | | | |
|---|---|---|---|---|
| 3,718,728 | A * | 2/1973 | Schrader | 264/346 |
| 5,714,547 | A * | 2/1998 | Li et al. | 525/240 |
| 6,294,231 | B1 * | 9/2001 | Kuwabara et al. | 428/1.52 |
| 2005/0142304 | A1 * | 6/2005 | Kawanishi et al. | 428/1.31 |
| 2005/0163923 | A1 | 7/2005 | Sasada | |
| 2005/0206810 | A1 * | 9/2005 | Sasaki et al. | 349/96 |
| 2005/0207016 | A1 * | 9/2005 | Ando | 359/586 |
| 2005/0212172 | A1 * | 9/2005 | Sakamaki | 264/216 |
| 2006/0105117 | A1 * | 5/2006 | Kim et al. | 428/1.1 |
| 2007/0254107 | A1 * | 11/2007 | Rao et al. | 427/372.2 |

FOREIGN PATENT DOCUMENTS

| | | |
|---|---|---|
| JP | 5-157911 A | 6/1993 |
| JP | 6-331826 A | 12/1994 |
| JP | 2000-231016 A | 8/2000 |
| JP | 2005-120352 A | 5/2005 |
| JP | 2005-242337 A | 9/2005 |
| JP | 2006-030937 A | 2/2006 |
| WO | WO 2006/001284 A1 | 1/2006 |

OTHER PUBLICATIONS

PCT/ISA/210 (International Search Report).
Notification Concerning Transmittal of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2007/053861, Sep. 4, 2008, The International Bureau of WIPO, Geneva, CH.
Japanese Official Action (Notification of Reasons for Rejection) dated Apr. 3, 2012, issued in corresponding Japanese Application No. 2007-040864 (with English translation).

* cited by examiner

Primary Examiner — Jeffrey Wollschlager
(74) Attorney, Agent, or Firm — Buchanan Ingersoll & Rooney PC

(57) ABSTRACT

A transparent polymer film satisfying $Rth/Re \geq -0.39$, $Re > 0$ and $Rth < 0$ and having a moisture permeability of 100-2000 $g/(m^2 \cdot day)$ at 40° C. and a relative humidity of 90%, and not containing an additive composition that raises Rth by at least 8 nm.

10 Claims, No Drawings

TRANSPARENT POLYMER FILM AND METHOD FOR PRODUCING IT, AND RETARDATION FILM, POLARIZER AND LIQUID CRYSTAL DISPLAY DEVICE COMPRISING THE FILM

TECHNICAL FIELD

The present invention relates to a transparent polymer film having optical anisotropy and capable of being directly stuck to a polarizing film, and a method for producing it, and to provide a retardation film, a polarizer and a liquid crystal display device comprising the transparent polymer film.

BACKGROUND ART

A polymer film of typically cellulose ester, polyester, polycarbonate, cyclo-olefin polymer, vinyl polymer or polyimide is used in silver halide photographic materials, retardation films, polarizers and image display devices. Films that are more excellent in point of the surface smoothness and the uniformity can be produced from these polymers, and the polymers are therefore widely employed for optical films.

Of those, cellulose ester films having suitable moisture permeability can be directly stuck to most popular polarizing films formed of polyvinyl alcohol (PVA)/iodine in on-line operation. Accordingly, cellulose acylate, especially cellulose acetate is widely employed as a protective film for polarizers.

On the other hand, when transparent polymer films are applied to optical use, for example, in retardation films, supports for retardation films, protective films for polarizers and liquid crystal display devices, the control of their optical anisotropy is an extremely important element in determining the performance (e.g., visibility) of display devices. With the recent demand for broadening the viewing angle of liquid crystal display devices, improvement of retardation compensation in the devices is desired, for which it is desired to suitably control the in-plane retardation Re (this may be simply referred to as Re) and the thickness-direction retardation Rth (this may be simply referred to as Rth) of the retardation film to be disposed between a polarizing film and a liquid crystal cell. In particular, since transparent polymer films having a negative Rth and satisfying Rth/Re$\geq$−0.39 are not easy to produce, and it is desired to produce them in a simplified manner.

For producing transparent polymer films having a negative Rth, disclosed is a method of forming a vertically-aligned liquid crystal layer on an isotropic transparent polymer film serving as a support (e.g., see JP-A-6-331826), but the method is problematic in that the production process according to it is complicated and that the producibility of the alignment.

For producing a transparent polymer film having a negative Rth, also disclosed is a method of utilizing a cellulose ester film having a high substitution degree of acetyl group (e.g., see JP-A-2005-120352). This method can give a film having suitable moisture permeability, but it is problematic in that a large amount of energy is necessary for dissolving the polymer and Re does not express sufficiently.

Further, for producing a transparent polymer film having Rth/Re$\geq$−0.5, disclosed is a continuous production method in which a transparent polymer film is adhered with a heat-shrinkable film and subjected to heating and stretching treatment (e.g., see JP-A-5-157911, JE-A-2000-231016). But the method is problematic in that a large amount of heat-shrinkable films are consumed in the practice of the method, and that, in addition, the variation occurs in the quality of the obtained film. The problem is especially distinct for a polymer having a high modulus of elasticity such as cellulose ester.

DISCLOSURE OF THE INVENTION

The present invention aims to provide a transparent polymer film having suitable moisture permeability, a negative Rth, Rth/Re$\geq$−0.39, and optical uniformity; and to provide a method for producing it. The invention also aims to provide a retardation film comprising the transparent polymer film of the invention; and a polarizer capable of exerting an excellent optical performance by sticking the transparent polymer film of the invention directly to a polarizing film as a retardation film, a support of a retardation film or a protective film for the polarizer. Further, the invention aims to provide a liquid crystal display device comprising the polarizer with a high reliability.

The above-mentioned problem can be solved by the following means.

(1) A method for producing a transparent polymer film comprising stretching a polymer film having Rth<0 to result in ΔRth>0:

$$\Delta Rth = [Rth \text{ after stretching}] - [Rth \text{ before stretching}]$$

wherein Rth is a thickness-direction retardation (unit: nm).

(2) The method for producing a transparent polymer film described in (1), wherein the polymer film after the stretching has a moisture permeability of at least 100 g/(m$^2$·day) at 40° C. and a relative humidity of 90%.

(3) The method for producing a transparent polymer film described in (1) or (2), wherein the stretching is carried out, after heat-treating the polymer film at a temperature of at least (Tg+60)° C. and then cooling it, at the cooling temperature or a higher temperature (wherein the Tg is the glass transition temperature of the polymer film).

(4) The method for producing a transparent polymer film described in any one of items (1) to (3), wherein the polymer film is a cellulose acylate film.

(5) The method for producing a transparent polymer film described in (4), wherein the stretching is carried out, after heat-treating the film at 200° C. or higher and then cooling it, at the cooling temperature or a higher temperature.

(6) The method for producing a transparent polymer film described in (3) or (5), wherein the difference between the heat treatment temperature and the stretching temperature is at least 1° C.

(7) The method for producing a transparent polymer film described in (3), (5) or (6), wherein the stretching temperature is lower than the heat treatment temperature.

(8) The method for producing a transparent polymer film described in any one of items (3), (5)-(7), wherein the heat treatment is a heat treatment that is carried out between two or more apparatuses holding the film in a transport direction with heating.

(9) The method for producing a transparent polymer film described in anyone of items (3), (5)-(8), wherein the cooling temperature is lower than the heat treatment temperature by at least 50° C.

(10) The method for producing a transparent polymer film described in any one of items (3), (5)-(9), wherein the film before the heat treatment has −1000$\leq$Rth<50: wherein Rth is a thickness-direction retardation (unit: nm).

(11) The method for producing a transparent polymer film described in any one of items (1)-(10), wherein the stretching is a tenter stretching.

(12) A transparent polymer film satisfying all of the following formulae (I)-(III) and having a moisture permeability of 100-2000 g/(m²·day) at 40° C. and a relative humidity of 90%, and not containing an additive composition that raises Rth by at least 8 nm:

$$Rth/Re \geq -0.39 \quad (I)$$

$$Re > 0 \quad (II)$$

$$Rth < 0 \quad (III)$$

wherein Re and Rth are retardations (unit: nm) in the in-plane direction and in the thickness direction, respectively.

(13) A transparent polymer film satisfying all of the following formulae (I)-(III) and having a moisture permeability of 100-2000 g/(m²·day) at 40° C. and a relative humidity of 90%, wherein the difference ($Rth_0 - Rth_1$) between Rth ($Rth_0$) of the transparent polymer film and Rth ($Rth_1$) that is measured after dipping the transparent polymer film in methanol at 25° C. for ultrasonic extraction for three hours and then drying it at 80° C. is less than 8 nm:

$$Rth/Re \geq -0.39 \quad (I)$$

$$Re > 0 \quad (II)$$

$$Rth < 0 \quad (III)$$

wherein Re and Rth are retardations (unit: nm) in the in-plane direction and in the thickness direction, respectively.

(14) The transparent polymer film described in (12) or (13) characterized by having been produced by the production method described in any one of items (1)-(11).

(15) The transparent polymer film described in any one of items (12)-(14), wherein the fluctuation range in the direction of a slow phase axis is less than 5°.

(16) The transparent polymer film described in any one of items (12)-(15) characterized by having a monolayer structure.

(17) The transparent polymer film described in any one of items (12)-(16), wherein a main component polymer is cellulose acylate.

(18) The transparent polymer film described in (17), wherein the cellulose acylate is cellulose acetate.

(19) A retardation film characterized by having at least one sheet of the transparent polymer film described in any one of items (12)-(18).

(20) A polarizer characterized by having at least one sheet of the transparent polymer film described in any one of items (12)-(18).

(21) The polarizer described in (20), wherein the transparent polymer film is stuck directly to a polarizing film.

(22) A liquid crystal display device characterized by having at least one of the transparent polymer film describe in any one of items (12)-(18), the retardation film described in (19), and the polarizer described in (20) or (21).

According to the invention, it is possible to provide an optically uniform transparent polymer film having suitable moisture permeability, a negative Rth, and $Rth/Re \geq -0.39$, and a method for producing it; and to provide an excellent retardation film. Since the transparent polymer film of the invention has reasonable moisture permeability, it can be stuck to a polarizing film in on-line operation, thereby making it possible to provide a polarizer excellent in visibility with a high productivity. In addition, it is possible to provide a liquid crystal display device having a high reliability.

BEST MODE FOR CARRYING OUT THE INVENTION

Described in detail hereinafter are the transparent polymer film and the method for producing it, the retardation film, the polarizer and the liquid crystal display device of the invention. The constituent features may be described below on the basis of representative embodiments of the invention, but the invention is not limited to such embodiments. The numerical range represented by "-" herein means a range including the numerical values described before and after "-" as the lowermost value and the uppermost value, respectively.

<<Transparent Polymer Film>>
[Retardation]

The transparent polymer film of the invention satisfies all of the following formulae (I)-(III):

$$Rth/Re \geq -0.39 \quad (I)$$

$$Re > 0 \quad (II)$$

$$Rth < 0 \quad (III)$$

wherein Re and Rth are retardations (unit: nm) in the in-plane direction and in the thickness direction, respectively, at the measuring wavelength of 632.8 nm.

The retardation in the invention is described. In this description, Re and Rth (unit: nm) are obtained according to the following method. A film to be analyzed is conditioned at 25° C. and a relative humidity of 60% for 24 hours. Using a prism coupler (Model 2010 Prism Coupler, by Metricon) and using a He—Ne laser at 632.8 nm, the mean refractivity (n) of the film, which is represented by the following formula (a), is obtained at 25° C. and a relative humidity of 60%.

$$n = (n_{TE} \times 2 + n_{TM})/3 \quad (a)$$

wherein $n_{TE}$ is the refractive index measured with polarizing light in the in-plane direction of the film; and $n_{TM}$ is the refractive index measured with polarizing light in the normal direction to the face of the film.

Next, using a birefringence meter (ABR-10A, by Uniopt) and using a He—Ne laser at 632.8 nm, the slow axis and the retardation of the conditioned film are determined at 25° C. and a relative humidity of 60% both in the vertical direction relative to the film surface and in the direction inclined by ±40° from the normal line to the film face relative to the slow axis direction in the film as the inclination axis (rotation axis). Then, using the mean refractive index obtained in the above, nx, ny and nz are computed. According to the following formulae (b) and (c), the in-plane retardation (Re) and the thickness-direction retardation (Rth) of the film are computed:

$$Re = (nx - ny) \times d \quad (b)$$

$$Rth = \{(nx + ny)/2 - nz\} \times d \quad (c)$$

wherein nx is the refractive index in the slow axis (x) direction of the film face; ny is the refractive index in the direction perpendicular to the direction x of the film face; nz is the refractive index in the thickness direction of the film (in the normal direction of the film face); d is the thickness (nm) of the film; and the slow axis is in the direction in which the refractive index is the largest in the film face.

The retardations of the transparent polymer film of the invention satisfy all of the above formulae (I)-(III). Here, the transparent polymer film of the invention satisfying all of the above formulae (I)-(III) preferably satisfies all of the following formulae (Ia)-(IIIa) respectively:

$$Rth/Re \geq -0.30 \quad \text{(Ia)}$$

$$Re \geq 15 \quad \text{(IIa)}$$

$$-300 \leq Rth < 0. \quad \text{(IIIa)}$$

The transparent polymer film of the invention even more preferably satisfies all of the following formulae (Ib)-(IIIb) respectively:

$$Rth/Re \geq -0.20 \quad \text{(Ib)}$$

$$30 \leq Re \leq 350 \quad \text{(IIb)}$$

$$-200 \leq Rth < 0. \quad \text{(IIIb)}$$

The transparent polymer film of the invention most preferably satisfies all of the following formulae (Ic)-(IIIc) respectively:

$$Rth/Re \geq -0.10 \quad \text{(Ic)}$$

$$40 < Re \leq 300 \quad \text{(IIc)}$$

$$-100 \leq Rth < 0. \quad \text{(IIIc)}$$

In the invention, the angle θ formed between the transfer direction and the slow phase axis of Re of the film is preferably 0±10° or 90±10°, more preferably 0±5° or 90±5°, even more preferably 0±3° or 90±3°, and as the case may be, it is preferably 0±1° or 90±1°, most preferably 90±1°. The fluctuation range of the direction of the slow phase axis is preferably less than 5°, more preferably less than 3°, even more preferably less than 1°, most preferably less than 0.5°, and as the case may be, it is furthermore preferably less than 0.1°.

[Thickness]

The thickness of the transparent polymer film of the invention is preferably 20 μm-180 μm, more preferably 40 μm-160 μm, even more preferably 60 μm-140 μm. When the thickness is less than 20 μm, the handling ability upon processing the film for a polarizer, or the curing of the polarizer is undesirable. The thickness unevenness of the transparent polymer film of the invention is preferably 0-2%, more preferably 0-1.5%, especially preferably 0-1%, in both of the transfer direction and the width direction.

[Moisture Permeability]

Next, moisture permeability is described. The moisture permeability in the invention means an evaluated value from the mass change (g/(m²·day)) before and after humidity conditioning when respective films are used for capping and sealing cups containing calcium chloride to be left under conditions of 40° C. and a relative humidity of 90% for 24 hours.

The moisture permeability rises with the rise of temperature, and also with the rise of humidity, but the relation between the magnitudes of the moisture permeability of films is changeless independently of respective conditions. Therefore, in the invention, the value of mass change at 40° C. and a relative humidity of 90% is employed as the standard.

The moisture permeability of the transparent polymer film of the invention is at least 100 g/(m²·day). The use of a film having the moisture permeability of at least 100 g/(m²·day) allows the film to be stuck directly to a polarizing film. The moisture permeability is preferably 100-1500 g/(m²·day), more preferably 300-1000 g/(m²·day), even more preferably 400-800 g/(m²·day).

When employing the transparent polymer film of the invention as a protective film on the outside that is not disposed between a polarizing film and liquid crystal cell as described later, the transparent polymer film of the invention has a moisture permeability of less than 500 g/(m²·day), more preferably 50-450 g/(m²·day), even more preferably 100-400 g/(m²·day), most preferably 150-300 g/(m²·day). This improves the durability of a polarizer for humidity, or humidity and heat, thereby making it possible to provide a liquid crystal display device with high reliability.

In order to prepare the film of the invention having a moisture permeability of at least 100 g/(m²·day) in terms of a thickness of 80 μm, preferred is the suitable control of hydrophilic/hydrophobic property of polymer, or the lowering of the film density. The former method includes, for example, such methods as controlling suitably the hydrophilic/hydrophobic property of the polymer backbone chain, and further introducing a hydrophobic or hydrophilic side branch; and the latter method includes, for example, such methods as introducing a side branch into the polymer backbone chain, selecting the type of solvent to be used at the film formation, and controlling the drying rate at the film formation.

[Tg]

20 mg of a sample before the heat treatment is put into a DSC pan, and this is heated from 30° C. up to 120° C. in a nitrogen atmosphere at 10° C./min and maintained for 15 minutes, and then cooled down to 30° C. at −20° C./min. Next, this is again heated from 30° C. up to 250° C., and the temperature at which the base line begins to deviate from the low-temperature side is referred to as Tg of the film.

[Polymer]

The polymer that is the constitutive element of the transparent polymer film of the invention includes cellulose ester, polyester, polycarbonate, cyclo-olefin polymer, vinyl polymer, polyamide and polyimide. Preferably, the polymer has a hydrophilic structure such as a hydroxyl group, an amido group, an imido group or an ester group in the backbone chain or the side branches thereof in order to attain suitable moisture permeability. For the polymer, more preferred is cellulose ester.

The polymer may be powdery or granular, or may be pelletized.

Preferably, the water content of the polymer is at most 1.0% by mass, more preferably at most 0.7% by mass, most preferably at most 0.5% by mass. As the case may be, the water content may be preferably at most 0.2% by mass. In case where the water content of the polymer is outside the preferred range, then it is desirable that the polymer is dried by heating before use.

One or more such polymers may be used herein either singly or as combined.

The cellulose ester includes cellulose ester compounds, and compounds having an ester-substituted cellulose skeleton that are obtained by biologically or chemically introducing a functional group into a starting material, cellulose. Of those, especially preferred is cellulose acylate.

Cellulose acylate is preferably used for the main component polymer of the transparent polymer film of the invention. The "main component polymer" as referred to herein is meant to indicate the polymer itself when the film is formed of a single polymer, and when the film is formed of different polymers, then it indicates the polymer having the highest mass fraction of all the polymers constituting the film.

The cellulose ester is an ester of cellulose with an acid. The acid to constitute the ester is preferably an organic acid, more preferably a carboxylic acid, even more preferably a fatty acid having from 2 to 22 carbon atoms, most preferably a lower fatty acid having from 2 to 4 carbon atoms.

The cellulose acylate is an ester of cellulose with a carboxylic acid. In the cellulose acylate, all or a part of the hydrogen atoms of the hydroxyl groups existing at the 2-, 3- and 6-positions of the glucose unit constituting the cellulose are substituted with an acyl group. Examples of the acyl group are acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl, cinnamoyl, most preferably acetyl, propionyl, butyryl.

The cellulose ester may be an ester of cellulose with different acids. The cellulose acylate may be substituted with different acyl groups.

For the transparent polymer film of the invention, cellulose acetate, a type of cellulose acylate having an ester with acetic acid is especially preferred. From the viewpoint of the solubility thereof in solvent, more preferred is cellulose acetate having a substitution degree of acetyl group of from 2.70 to 2.87, and most preferred is cellulose acetate having from 2.80 to 2.86.

Regarding a method for producing cellulose acylate, its basic principle is described in *Wood Chemistry* by Nobuhiko Migita et al., pp. 180-190 (Kyoritsu Publishing, 1968). One typical method for producing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to produce a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is from 150 to 500 as the viscosity-average polymerization degree thereof, more preferably from 200 to 400, even more preferably from 220 to 350. The viscosity-average polymerization degree may be measured according to a limiting viscosity method by Uda et al. (Kazuo Uda, Hideo Saito; *Journal of the Fiber Society of Japan*, Vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (high polymerization degree), but its viscosity may be lower than that of ordinary cellulose acylate. Such cellulose acylate where the amount of low-molecular components is small may be obtained by removing low-molecular components from cellulose acylate produced in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be from 0.5 to 25 parts by mass relative to 100 parts by mass of cellulose. When the amount of the sulfuric acid catalyst is controlled to fall within the range, then cellulose acylate having a preferable molecular weight distribution (uniform molecular weight distribution) can be produced.

The starting material, cotton for cellulose ester and methods for producing it are described also in Hatsumei Kyokai Disclosure Bulletin (No. 2001-1745, issued Mar. 15, 2001, Hatsumei Kyokai), pp. 7-12.

[Production of Transparent Polymer Film]

The transparent polymer film of the invention may be produced from a polymer solution that contains polymer and various additives, according to a method of solution casting film formation. In case where the melting point of the polymer of the invention or the melting point of a mixture of the polymer with various additives is lower than the decomposition temperature thereof and is higher than the stretching temperature thereof, then the polymer film may also be produced according to a method of melt film formation. The transparent polymer film of the invention may be produced according to such a method of melt film formation, and the method of melt film formation is described in JP-A-2000-352620.

[Polymer Solution]
(Solvent)

The transparent polymer film of the invention may be produced, for example, according to a method of solution casting film formation where a polymer solution that contains a polymer and optionally various additives is cast into a film.

The main solvent of the polymer solution (preferably, cellulose ester solution) to be used in producing the transparent polymer film of the invention is preferably an organic solvent that is a good solvent for the polymer. The organic solvent of the type is preferably one having a boiling point of not higher than 80° C. from the viewpoint of reducing the load in drying. More preferably, the organic solvent has a boiling point of from 10 to 80° C., even more preferably from 20 to 60° C. As the case may be, an organic solvent having a boiling point of from 30 to 45° C. may also be preferably used for the main solvent.

The main solvent includes halogenohydrocarbons, esters, ketones, ethers, alcohols and hydrocarbons, which may have a branched structure or a cyclic structure. The main solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom). Regarding the main solvent of the polymer solution (preferably, cellulose ester solution) to be used in producing the transparent polymer film of the invention, when the solvent of the solution is a single solvent, then it is the main solvent, but when the solvent is a mixed solvent of different solvents, then the main solvent is the solvent having the highest mass fraction of all the constitutive solvents.

The halogenohydrocarbon is preferably a chlorohydrocarbon, including dichloromethane and chloroform, and dichloromethane is more preferred.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent that may be combined with the main solvent includes halogenohydrocarbons, esters, ketones, ethers, alcohols and hydrocarbons, which may have a branched structure or a cyclic structure. The organic solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom).

The halogenohydrocarbon is preferably a chlorohydrocarbon, including dichloromethane and chloroform, and dichloromethane is more preferred.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol.

The hydrocarbon includes, for example, n-pentane, cyclohexane, n-hexane, benzene, toluene, xylene.

The organic solvent having two or more different types of functional groups includes, for example, 2-ethoxyethyl acetate, 2-methoxyethanol, 2-butoxyethanol, methyl acetacetate.

In case where the polymer that constitutes the transparent polymer film of the invention includes cellulose acylate, then it is desirable that the total solvent for it contains from 5% to 30% by mass, more preferably from 7% to 25% by mass, even more preferably from 10% to 20% by mass of alcohol from the viewpoint of reducing the load for film peeling from band.

In addition, from the viewpoint of Rth reduction, the polymer solution to be used for producing the transparent polymer film of the invention is preferably so designed that the content of the organic solvent therein which has a boiling point of 95° C. or higher and is not therefore so much evaporated away along with halogenohydrocarbon in the initial drying stage but is gradually concentrated therein, or that is, the content of such a bad solvent for cellulose ester is from 1% to 15% by mass, more preferably from 1.5% to 13% by mass, even more preferably from 2% to 10% by mass.

Preferred examples of the combination of organic solvents for use as the solvent in the polymer solution to be used in producing the transparent polymer film of the invention are mentioned below, to which, however, the invention should not be limited. The numerical data for ratio are parts by mass.

(1) Dichloromethane/methanol/ethanol/butanol=80/10/5/5
(2) Dichloromethane/methanol/ethanol/butanol=80/5/5/10
(3) Dichloromethane/isobutyl alcohol=90/10
(4) Dichloromethane/acetone/methanol/propanol=80/5/5/10
(5) Dichloromethane/methanol/butanol/cyclohexane=80/8/10/2
(6) Dichloromethane/methyl ethyl ketone/methanol/butanol=80/10/5/5
(7) Dichloromethane/butanol=90/10
(8) Dichloromethane/acetone/methyl ethyl ketone/ethanol/butanol=68/10/10/7/5
(9) Dichloromethane/cyclopentanone/methanol/pentanol=80/2/15/3
(10) Dichloromethane/methyl acetate/ethanol/butanol=70/12/15/3
(11) Dichloromethane/methyl ethyl ketone/methanol/butanol 80/5/5/10
(12) Dichloromethane/methyl ethyl ketone/acetone/methanol/pentanol=50/20/15/5/10
(13) Dichloromethane/1,3-dioxolan/methanol/butanol=70/15/5/10
(14) Dichloromethane/dioxane/acetone/methanol/butanol=75/5/10/5/5
(15) Dichloromethane/acetone/cyclopentanone/ethanol/isobutyl alcohol/cyclohexanone=60/18/3/10/7/2
(16) Dichloromethane/methyl ethyl ketone/acetone/isobutyl alcohol=70/10/10/10
(17) Dichloromethane/acetone/ethyl acetate/butanol/hexane=69/10/10/10/1
(18) Dichloromethane/methyl acetate/methanol/isobutyl alcohol=65/15/10/10
(19) Dichloromethane/cyclopentanone/ethanol/butanol=85/7/3/5
(20) Dichloromethane/methanol/butanol=83/15/2
(21) Dichloromethane=100
(22) Acetone/ethanol/butanol=80/15/5
(23) Methyl acetate/acetone/methanol/butanol=75/10/10/5
(24) 1,3-dioxolan=100
(25) Dichloromethane/methanol=85/15
(26) Dichloromethane/methanol=92/8
(27) Dichloromethane/methanol=90/10
(28) Dichloromethane/methanol=87/13
(29) Dichloromethane/ethanol=90/10

A detailed description of a case where a non-halogen organic solvent is the main solvent is given in Hatsumei Kyokai Disclosure Bulletin (No. 2001-1745, issued Mar. 15, 2001, Hatsumei Kyokai), which may be conveniently referred to herein.

(Solution Concentration)

The polymer concentration in the polymer solution to be prepared herein is preferably from 5% to 40% by mass, more preferably from 10% to 30% by mass, most preferably from 15% to 30% by mass.

The polymer concentration may be so controlled that it could be a predetermined concentration in the stage where polymer is dissolved in solvent. Apart from it, a solution having a low concentration (e.g., from 4% to 14% by mass) is previously prepared, and then it may be concentrated by evaporating the solvent from it. On the other hand, a solution having a high concentration is previously prepared, and it may be diluted. The polymer concentration in the solution may also be reduced by adding additive thereto.

(Additive)

The polymer solution to be used for producing the transparent polymer film of the invention may contain various liquid or solid additives in accordance with the use of the film, in the steps of producing it. Examples of the additives are plasticizer (its preferred amount is from 0.01% to 10% by mass of the polymer—the same shall apply hereunder), UV absorbent (0.001% to 1% by mass), powdery particles having a mean particle size of from 5 to 3000 nm (0.001% to 1% by mass), fluorine-containing surfactant (0.001% to 1% by mass), release agent (0.0001% to 1% by mass), antioxidant (0.0001% to 1% by mass), optical anisotropy-controlling agent (0.01% to 10% by mass), IR absorbent (0.001% to 1% by mass).

The plasticizer and the optical anisotropy-controlling agent are organic compounds having a molecular weight of at most 3000, preferably those having both a hydrophilic part and a hydrophobic part. These compounds are aligned between the polymer chains, therefore changing the retardation of the polymer film. Combined with cellulose acylate that is especially preferably used in the invention, these compounds may improve the hydrophobicity of the polymer film and may reduce the moisture-dependent change of the retardation thereof. When combined with the above-mentioned UV absorbent or IR absorbent, they may effectively control the wavelength dependence of the retardation of the polymer film. The additives to be used in the transparent polymer film of the invention are preferably those not substantially evaporating in the step of drying the film.

Of the plasticizer and the optical anisotropy-controlling agent, additives to be used in the invention are not particularly limited, but a plasticizer or an optical anisotropy-controlling agent, which has an effect capable of raising Rth by more than 8 nm according to a measurement method as described below, is preferably not added. There is no particular limitation on the type, amount and concentration of such compound, and evaluation is possible according to the method shown below.

Rth (unit: nm) raised by an additive can be evaluated in the invention as the difference between Rth of the film formed with an additive and Rth of a film formed without an additive.

An additive having an effect of raising Rth is defined as an additive showing a plus value of the difference ($Rth_0-Rth_1$) between Rth ($Rth_1$) measured after dipping a film in a solvent capable of dissolving the additive and incapable of dissolving the film at 25° C., for example, methanol or tetrahydrofuran for subjecting it to ultrasonic extraction for three hours and further drying the film at 80° C. for 10 minutes, and Rth ($Rth_0$) measured before the treatment with the solvent. With regard to the film of the invention, the difference is preferably less than 8 nm, more preferably from −100 to less than 8 nm, even more preferably −50-5 nm, most preferably −30-3 nm. The use of the additive capable of controlling ($Rth_0-Rth_1$) of the film to the above preferable range can lower the fluctuation range in the slow phase axis direction of the produced film.

From the viewpoint of reducing the moisture-dependent retardation change of the film, the amount of these additives to be added to the polymer film is preferably larger, but with the increase in the amount, there may occur some problems in that the glass transition temperature (Tg) of the film may lower and the additives may evaporate away during the process of film formation. Accordingly, in case where cellulose acetate which is preferred in the invention is used as the polymer, then the amount of the additives having a molecular weight of at most 3000 is preferably from 0.01% to 30% by mass, more preferably from 2% to 30% by mass, even more preferably from 5% to 20% by mass relative to the polymer.

A plasticizer preferred for the case where cellulose acylate is used as the polymer to constitute the transparent polymer film of the invention is described in JP-A-2001-151901. IR absorbent is described in JP-A-2001-194522. The time for additive addition may be determined depending on the type of the additive.

(Preparation of Polymer Solution)

The polymer solution may be prepared, for example, according to the methods described in JP-A-58-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184 and JP-A-2000-273239. Concretely, polymer and solvent are mixed and stirred so that the polymer is swollen, and as the case may be, this is cooled or heated so as to dissolve the polymer, and thereafter this is filtered to obtain a polymer solution.

[Casting, Drying]

The transparent polymer film of the invention may be produced according to a conventional method of solution casting film formation, using a conventional apparatus for solution casting film formation. Concretely, a dope (polymer solution) prepared in a dissolver (tank) is filtered, and then once stored in a storage tank in which the dope is degassed to be a final dope. The dope is kept at 30° C., and fed into a pressure die from the dope discharge port of the tank, via a metering pressure gear pump through which a predetermined amount of the dope can be fed with accuracy, for example, based on the controlled revolution thereof, and then the dope is uniformly cast onto the metal support of a casting unit that runs endlessly, via the slit of the pressure die (casting step). Next, at a peeling point at which the metal support reaches almost after having traveled round the drum, a semi-dried dope film (this may be referred to as a web) is peeled from the metal support, and then transported to a drying zone in which the web is dried while conveyed with rolls therein. In this invention, the metal support is preferably a metal belt.

Thus dried film has a residual solvent amount of preferably 0-2% by mass, more preferably 0-1% by mass. The dried film (original film) has the Rth of preferably from −1000 nm to less than 50 nm, more preferably −100-45 nm, even more preferably −50-40 nm. The film has a width of preferably 0.5-5 m, more preferably 0.7-3 m.

This film may be directly transported to a stretching zone or heat treatment zone, or may be wound and then subjected to stretching or heat treatment in off-line operation. When the film is once wound, the wound length is preferably 300-30000 m, more preferably 500-10000 m, even more preferably 1000-7000 m.

[Stretching]

In the production method of the invention, in order to attain targeted Re and Rth, the polymer film is stretched to raise Rth. The Rth before the stretching is less than 0 nm, preferably −1000--10 nm, more preferably −500--20 nm, even more preferably −300--30 nm, most preferably −200--40 nm, and as the case may be, it is furthermore preferably −150--50 nm. Such film can be obtained by, for example, heat treatment described later, wherein an obtained film is stretched to raise the film density and Rth, thereby making it possible to raise Rth/Re.

(Stretching Method)

The stretching may be longitudinal stretching carried out, for example, between two or more apparatuses (e.g., nip rolls, suction drum) holding the film in transport direction, wherein the circumferential velocity on an exit side is larger, but preferably it is transversal stretching carried out for widening the film in the direction perpendicular to the transport direction. For example, tenter stretching is more preferred, which is carried out by clipping the both ends of the film with tenter clips in an apparatus having a heating zone. The stretching ratio can be arbitrarily set in accordance with the retardation desired for the film, and is preferably 1-500%, more preferably 3-400%, even more preferably 5-300%, especially preferably 10-100%. The stretching may be effected in one step operation or multi-step operation. The stretching ratio (%) herein is a value obtained using the following formula.

Stretching ratio (%)=100×{(length after stretching)−(length before stretching)}/length before stretching The stretching velocity in the stretching is preferably 10-10000%/min, more preferably 20-1000%/min, even more preferably 30-800%/min.

[Heat Treatment]

In the invention, in order to attain targeted Re and Rth, a process of heat-treating the formed transparent polymer film is preferably combined with the stretching process. The heat treatment process is preferably carried out prior to the stretching process. Preferably the film is once cooled after the heat treatment and then subjected to the stretching process.

(Temperature)

The heat treatment temperature is preferably at least (Tg+50)° C., more preferably at least (Tg+60)° C., still more preferably (Tg+60)-(Tg+180)° C., even more preferably (Tg+65)-(Tg+150)° C., especially preferably (Tg+70)-(Tg+100)° C. In case where the main component polymer of the polymer film is cellulose acylate, the temperature is preferably at least 200° C., more preferably 200-280° C., even more preferably 210-270°, especially preferably 220-250° C.

The cooling temperature is lower than the heat treatment temperature by preferably at least 50° C., more preferably 100-300° C., even more preferably 150-250° C.

The difference between the heat treatment temperature and the stretching temperature is preferably at least 1° C., more preferably 10-200° C., even more preferably 30-150° C., especially preferably 50-100° C. The stretching temperature is preferably lower than the heat treatment temperature. By suitably setting the temperature difference, Rth/Re can be controlled.

(Method of Heat Treatment)

The heat treatment is preferably carried out while transporting the film in a heating zone maintained at the above-described temperature. In this case, the treatment is preferably carried out between two or more apparatuses (e.g., nip rolls, suction drum) holding the film in the transport direction with heating. For example, it may be carried out in an apparatus having a heating zone between two pairs of nip rolls.

The treatment may be carried out without or with the difference between circumferential velocities on the entrance side and the exit side. In case of giving the difference between the circumferential velocities, the elongation of the film is controlled to preferably 3-500%, more preferably 5-100%, even more preferably 10-80%, especially preferably 20-60%. The elongation of the film (%) herein is a value obtained using the following formula.

Elongation of film (%)=100×{(length after heat treatment)−(length before heat treatment)}/length before heat treatment The transparent polymer film of the invention has preferably a monolayer structure. A film having a monolayer structure is a polymer film of one sheet, instead of one composed of a plurality of stuck film materials. Also included is one sheet of polymer film produced from a plurality of polymer solutions by a sequential flow casting system or co-flow casting system. In this case, a polymer film having a distribution in the thickness direction can be obtained by suitably adjusting the type or blending amount of an additive, the molecular weight distribution of the polymer, or the type of the polymer, etc. Also included is a film having various functional portions such as an optical anisotropic portion, an antiglare portion, a gas barrier portion or a moisture resistant portion in one film.

[Surface Treatment]

The transparent polymer film of the invention may be surface-treated in any desired manner to thereby improve its adhesiveness to various functional layers (e.g., undercoat layer, back layer, optically anisotropic layer). The surface treatment includes glow discharge treatment, UV irradiation treatment, corona treatment, flame treatment, saponification treatment (acid saponification treatment, alkali saponification treatment). In particular, glow discharge treatment and alkali saponification treatment are preferred. The "glow discharge treatment" as referred to herein is a plasma treatment of treating a film surface in the presence of a plasma-exciting vapor. The details of the surface treatment are described in Hatsumei Kyokai Disclosure Bulletin (No. 2001-1745, issued Mar. 15, 2001, Hatsumei Kyokai), and may be conveniently referred to herein.

For improving the adhesiveness between the film surface of the transparent polymer film of the invention and a functional layer to be formed thereon, an undercoat layer (adhesive layer) may be formed on the film in place of or in addition to the surface treatment as above. The undercoat layer is described in Hatsumei Kyokai Disclosure Bulletin (No. 2001-1745, issued Mar. 15, 2001, Hatsumei Kyokai), page 32, which may be conveniently referred to herein. Functional layers that may be formed on the transparent polymer film of the invention are described in Hatsumei Kyokai Disclosure Bulletin (No. 2001-1745, issued Mar. 15, 2001, Hatsumei Kyokai), pp. 32-45, which may be conveniently referred to herein.

<<Retardation Film>>

The transparent polymer film of the invention may be used as a retardation film. "Retardation film" means an optical material that is generally used in display devices such as liquid crystal display devices and has optical anisotropy, and its meaning may be the same as that of retarder, optical compensatory film, and optical compensatory sheet. In a liquid crystal display device, the retardation film is used for the purpose of increasing the contrast of the display panel and improving the viewing angle characteristic and the coloration thereof.

Using the transparent polymer film of the invention makes it easy to produce a retardation film of which Re and Rth can be controlled in any desired manner. For example, as a retardation film of which the retardation does not change dependently of the inclination angle to the slow axis direction, a film that satisfies Re≧30 nm and |Rth|≦15 nm can be favorably produced; and a film that satisfies Re≧50 nm and |Rth|≦10 nm can be produced more favorably.

The transparent polymer film of the invention may be used as a retardation film directly as it is. Plural sheets of the transparent polymer film of the invention may be laminated, or the transparent polymer film of invention may be laminated with any other film not falling within the scope of the invention, and the resulting laminate films thus having suitably controlled Re and Rth may also be used as retardation films. For laminating the films, a paste or an adhesive may be used.

As the case may be, the transparent polymer film of the invention may be used as a support of retardation films. An optically anisotropic layer of liquid crystal may be provided on the support to give a retardation film. The optical-anisotropic layer applicable to the retardation film of the invention may be formed of, for example, a composition containing a liquid crystalline compound or a polymer film having birefringence.

The liquid crystalline compound is preferably a discotic liquid crystalline compound or a rod-shaped liquid crystalline compound.

[Discotic Liquid crystalline Compound]

Examples of the discotic liquid crystalline compound usable in the invention are described in various publications (e.g., C. Destrade et al., *Mol. Cryst. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, Vol. 116, page 2655 (1994)).

Preferably, the discotic liquid crystalline molecules are fixed as aligned in the optically anisotropic layer; and most preferably, they are fixed through polymerization. The polymerization of discotic liquid crystalline molecules is described in JP-A-8-27284. For fixing discotic liquid crystalline molecules through polymerization, it is necessary that a substituent of a polymerizing group is bonded to the disc core of the discotic liquid crystalline molecules. However, when a polymerizing group is directly bonded to the disc core, then the molecules could hardly keep their alignment condition during the polymerization. Accordingly, a linking group is introduced between the disc core and the polymerizing group. The discotic liquid crystalline molecules having a polymerizing group are disclosed in JP-A-2001-4387.

[Rod-Shaped Liquid Crystalline Compound]

Examples of the rod-shaped liquid crystalline compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexyl-benzonitriles. However, not limited to such low-molecular rod-shaped liquid crystalline compounds, also usable herein are high-molecular rod-shaped liquid crystal compounds.

In the optically anisotropic layer, the rod-shaped liquid crystalline molecules are preferably fixed as aligned therein; and most preferably, they are fixed through polymerization. Examples of the polymerizing rod-shaped liquid crystalline compound usable in the invention are described, for example, in *Macromol. Chem.*, Vol. 190, page 2255 (1989); *Advanced materials*, Vol. 5, page 107 (1993); U.S. Pat. No. 4,683,327, U.S. Pat. No. 5,622,648, U.S. Pat. No. 5,770,107; WO95/22586, WO95/24455, WO97/00600, WO98/23580, WO98/52905; JP-A-1-272551, JP-A-6-16616, JP-A-7-110469, JP-A-11-80081 and JP-A-2001-328973.

(Optically Anisotropic Layer of Polymer Film)

The optically anisotropic layer may be formed of a polymer film. The polymer film may be made of a polymer capable of expressing optical anisotropy. Examples of the polymer capable of expressing optical anisotropy are polyolefins (e.g., polyethylene, polypropylene, norbornenic polymer), polycarbonates, polyarylates, polysulfones, polyvinyl alcohols, polymethacrylates, polyacrylates, and cellulose esters (e.g., cellulose triacetate, cellulose diacetate). The polymer may be a copolymer or a polymer mixture of these polymers.

<<Polarizer>>

The transparent polymer film or the retardation film of the invention may be used as a protective film of a polarizer (polarizer of the invention). The polarizer of the invention comprises a polarizing film and two polarizer-protective films (transparent polymer films) that protect both surfaces of the film, in which the transparent polymer film or the retardation film of the invention may be used as at least one of the polarizer-protective films.

In case where the transparent polymer film of the invention is used as the polarizer-protective film, then it is desirable that the transparent polymer film of the invention is subjected to the above-mentioned surface treatment (described also in JP-A-6-94915, JP-A-6-118232) for hydrophilication. For example, the film is preferably subjected to glow discharge treatment, corona discharge treatment or alkali saponification treatment. In particular, when the polymer to constitute the transparent polymer film of the invention is cellulose acylate, then the surface treatment is most preferably alkali saponification treatment.

For the polarizing film, for example, herein usable is a polyvinyl alcohol film dipped and stretched in an iodine solution. In case where such a polyvinyl alcohol dipped and stretched in an iodine solution is used as the polarizing film, then the treated surface of the transparent polymer film of the invention may be directly stuck to both surfaces of the polarizing film with an adhesive. In the production method of the invention, it is desirable that the transparent polymer film is directly stuck to the polarizing film in that manner. The adhesive may be an aqueous solution of polyvinyl alcohol or polyvinyl acetal (e.g., polyvinyl butyral), or a latex of vinylic polymer (e.g., polybutyl acrylate). An especially preferred example of the adhesive is an aqueous solution of completely-saponified polyvinyl alcohol.

In a liquid crystal display device, in general, a liquid crystal cell is provided between two polarizers, and therefore, the device has four polarizer-protective films. The transparent polymer film of the invention may be used as any of the four polarizer-protective films. Especially advantageously in such a liquid crystal display device, the transparent polymer film of the invention is used as the protective film to be disposed between the polarizing film and the liquid crystal layer (liquid crystal cell). On the protective film to be disposed on the opposite side to the transparent polymer film of the invention via the polarizing film therebetween, optionally provided is a transparent hard-coat layer, an antiglare layer or an antireflection layer. In particular, the film of the invention is favorably used as the polarizer-protective film on the outermost side of the display panel of a liquid crystal display device.

<<Liquid Crystal Display Device>>

The transparent polymer film, the retardation film and the polarizer of the invention may be used in liquid crystal display devices of various display modes. Liquid crystal display modes to which the films are applicable are described below. Of those modes, the transparent polymer film, the retardation film and the polarizer of the invention are favorably used in liquid crystal display devices of VA mode and IPS mode. The liquid crystal display devices may be any of transmission type, reflection type or semi-transmission type.

(TN-Type Liquid Crystal Display Device)

The transparent polymer film of the invention may be used as a support of the retardation film in a TN-type liquid crystal display device having a TN-mode liquid crystal cell. TN-mode liquid crystal cells and TN-type liquid crystal display devices are well known from the past. The retardation film to be used in TN-type liquid crystal display devices is described in JP-A-3-9325, JP-A-6-148429, JP-A-8-50206, JP-A-9-

26572; and Mori et al's reports (*Jpn. J. Appl Phys.*, Vol. 36 (1997), p. 143; *Jpn. J. Appl Phys.*, Vol. 36 (1997), p. 1068).

(STN-Type Liquid Crystal Display Device)

The transparent polymer film of the invention may be used as a support of the retardation film in an STN-type liquid crystal display device having an STN-mode liquid crystal cell. In general, in an STN-type liquid crystal display device, the rod-shaped liquid crystalline molecules in the liquid crystal cell are twisted within a range of from 90 to 360 degrees, and the product ($\Delta n d$) of the refractive anisotropy ($\Delta n$) of the rod-shaped liquid crystalline molecule and the cell gap (d) is within a range of from 300 to 1500 nm. The retardation film to be used in STN-type liquid crystal display devices is described in JP-A-2000-105316.

(VA-Type Liquid Crystal Display Device)

The transparent polymer film of the invention is especially advantageously used as the retardation film or as a support of the retardation film in a VA-type liquid crystal display device having a VA-mode liquid crystal cell. The VA-type liquid crystal display device may be a multi-domain system, for example, as in JP-A-10-123576. In these embodiments, the polarizer that comprises the transparent polymer film of the invention contributes to enlarging the viewing angle of the display panel and to improving the contrast thereof.

(IPS-Type Liquid Crystal Display Device and ECB-Type Liquid Crystal Display Device)

The transparent polymer film of the invention is especially advantageously used as the retardation film, as a support of the retardation film or as a protective film of the polarizer in an IPS-type liquid crystal display device and an ECB-type liquid crystal display device having an IPS-mode or ECB-mode liquid crystal cell. In the devices of these modes, the liquid crystal material is aligned nearly in parallel in black display, or that is, the liquid crystal molecules are aligned in parallel to the substrate face while no voltage is applied thereto, thereby giving black display. In these embodiments, the polarizer that comprises the transparent polymer film of the invention contributes to enlarging the viewing angle of the display panel and to improving the contrast thereof.

(OCB-Type Liquid Crystal Display Device and HAN-Type Liquid Crystal Display Device)

The transparent polymer film of the invention is also especially advantageously used as a support of the retardation film in an OCE-type liquid crystal display device having an OCB-mode liquid crystal cell and in a HAN-type liquid crystal display device having a HAN-mode liquid crystal cell. The retardation film to be used in an OCB-type liquid crystal display device and a HAN-type liquid crystal display device is preferably so designed that the direction in which the absolute value of the retardation of the film is the smallest does not exist both in the in-plane direction of the retardation film and in the normal direction thereof. The optical properties of the retardation film to be used in an OCB-type liquid crystal display device and a HAN-type liquid crystal display device may vary depending on the optical properties of the optically anisotropic layer therein, the optical properties of the support therein and the relative positioning of the optically anisotropic layer and the support therein. The retardation film to be used in an OCB-type liquid crystal display device and a HAN-type liquid crystal display device is described in JP-A-9-197397. It is described also in a Mori et al's report (*Jpn. J. Appi. Phys.*, Vol. 38 (1999), p. 2837).

(Reflection-Type Liquid Crystal Display Device)

The transparent polymer film of the invention may be advantageously used also as the retardation film in TN-mode, STN-mode, HAN-mode and GH (guest-host)-mode reflection-type liquid crystal display devices. These display modes are well known from the past. TN-mode reflection-type liquid crystal display devices are described in JP-A-10-123478, WO98/48320, and Japanese Patent 3022477. The retardation film for use in reflection-type liquid crystal display devices is described in WO00/65384.

(Other Liquid Crystal Display Devices)

The transparent polymer film of the invention may be advantageously used also as a support of the retardation film in an ASM (axially symmetric aligned microcell)-type liquid crystal display device having an ASH-mode liquid crystal cell. The ASM-mode liquid crystal cell is characterized in that the cell thickness is held by a position-adjustable resin spacer. The other properties of the cell are the same as those of the TN-mode liquid crystal cell. The ASH-mode liquid crystal cell and the ASM-type liquid crystal display device are described in a Kume et al's report (Kume et al., SID 98 Digest 1089 (1988)). (Hard Coat Film, Antiglare Film, Antireflection Film)

As the case may be, the transparent polymer film of the invention may be applied to a hard coat film, an antiglare film and an antireflection film. For the purpose of improving the visibility of flat panel displays such as LCD, PDP, CRT, EL, any or all of a hard coat layer, an antiglare layer and an antireflection layer may be given to one or both surfaces of the transparent polymer film of the invention. Preferred embodiments of such antiglare film and antireflection film are described in detail in Hatsumei Kyokai Disclosure Bulletin (No. 2001-1745, issued Mar. 15, 2001, Hatsumei Kyokai), pp. 54-57, and are preferably employed also for the transparent polymer film of the invention.

EXAMPLES

<<Methods for Measurement>>

Methods for measuring and evaluating the characteristics as referred to in the following Examples are described.

[Retardation]

Sampling was carried out at five portions in the width direction (center, edge portions (5% of the overall width from both edges), and respective two portions at the intermediate of the center and the edges) every 100 m in the longitudinal direction, and 2 cm—square samples were taken out and evaluated according to the above—described method. Then, the values for respective portions were averaged to give Re and Rth. And, the difference between the maximum and the minimum values of declination (unit: °, a value can be −45° to +45°) in the direction of the slow phase axis from the transport direction or the direction perpendicular thereto at respective positions was obtained as the fluctuation range in the direction of the slow phase axis.

[Moisture Permeability]

Moisture permeability was determined according to the method mentioned above.

[Tg]

The value determined according to the method mentioned above is Tg of the film analyzed.

[Polarization]

Two sheets of the polarizer produced herein are stuck together with their absorption axes kept in parallel to each other and the transmittance (Tp) thereof is measured; and they are stuck together with their absorption axes kept perpendicular to each other and the transmittance (Tc) thereof is measured. The polarization (P) of the polarizer is computed according to the following formula:

$$\text{Polarization}, P = ((Tp - Tc)/(Tp + Tc))^{0.5}$$

The characteristics of the invention are described more concretely with reference to the following Examples and Comparative Examples. In the following Examples, the materials used, its amount and the ratio, the details of the treatment and the treatment process may be suitably modified or changed not overstepping the sprit and the scope of the invention. Accordingly, the invention should not be limitatively interpreted by the Examples mentioned below.

Examples 101 to 111, Comparative Examples 101 to 105

(Preparation of Polymer Solution)
1) Polymer:
In Examples and Comparative Examples, a polymer A mentioned below was used. The polymer A was heated and dried at 120° C. to have a reduced water content of at most 0.5% by mass, and 20 parts by mass of the polymer A was used herein.
Polymer A:
The polymer A is a powder of cellulose acetate having a substitution degree of 2.85. The viscosity-average polymerization degree of the polymer A was 300; the substitution degree of 6-acetyl group thereof was 0.89; the acetone extract fraction thereof was 7% by mass; the ratio of weight-average molecular weight/number-average molecular weight thereof was 2.3; the water content thereof was 0.2% by mass; the viscosity thereof in 6 mas. % dichloromethane solution was 305 mPa·s; the amount of the residual acetic acid therein was at most 0.1% by mass; the Ca content thereof was 65 ppm; the Mg content thereof was 26 ppm; the iron content thereof was 0.8 ppm; the sulfate ion content thereof was 18 ppm; the yellowness index thereof was 1.9; and the amount of free acetic acid therein was 47 ppm. The mean particle size of the powder was 1.5 mm, and the standard deviation thereof was 0.5 mm.
[Substitution Degree]
The substitution degree of acyl group of cellulose acylate is determined through $^{13}$C-NMR according to the method described in *Carbohydr. Res.* 273 (1995), 83-91 (by Tezuka, et al).
[Polymerization Degree]
The cellulose acylate produced herein is absolutely dried, then about 0.2 g thereof is accurately weighed, and dissolved in 100 mL of a mixed solvent of dichloromethane/ethanol=9/1 (by mass). Using an Ostwald viscometer, the time (second) taken by its dropping at 25° C. is counted, and the polymerization degree, DP of the polymer is calculated according to the following formulae:

$\eta_{rel} = T/T_0$ $[\eta] = \ln(\eta_{rel})/C$ $DP = [\eta]/Km$ wherein T indicates the time (second) taken by the dropping sample; $T_0$ indicates the time (second) taken by the dropping solvent alone; ln indicates a natural logarithm; C indicates the concentration (g/L); Km is $6 \times 10^{-4}$.
2) Solvent
In respective Examples and Comparative Examples, the following mixed solvents were employed (see Table 1). Each solvent had the water content of at most 0.2% by mass.
Solvent A: dichloromethane/methanol/butanol (83/15/2 parts by mass)
Solvent B: dichloromethane/methanol (90/10 parts by mass)

3) Additive
In respective Examples and Comparative Examples, either an additive composition A or B having the following composition was used according to Table 1 below.
Additive composition A:
Silicon dioxide fine particles (particle size: 20 nm, Mohs hardness: about 7) (0.08 part by mass)
Additive composition B:
Triphenyl phosphate (1.6 parts by mass)
Biphenyldiphenyl phosphate (0.8 part by mass)
Silicon dioxide fine particles (particle size: 20 nm, Mohs hardness: about 7) (0.08 part by mass)
Additive composition C:
Triphenyl phosphate (1.6 parts by mass)
Biphenyldiphenyl phosphate (0.8 part by mass)
Retardation-enhancing agent having the following structure (0.6 part by mass)

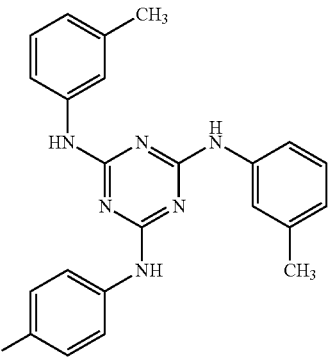

Silicon dioxide fine particles (particle size: 20 nm, Mohs hardness: about 7) (0.08 part by mass)
4) Swelling, Dissolution:
In Examples and Comparative Examples, the solvent and the additive mentioned above were put into a 400-liter stainless solution tank, which has stirring blades and is cooled with cooling water that runs around its periphery. With stirring and dispersing them therein, the polymer was gradually added to the tank. After the addition, this was stirred at room temperature for 2 hours. After thus swollen for 3 hours, this was again stirred to obtain a polymer solution.

For the stirring, used were a dissolver-type eccentric stirring shaft that runs at a peripheral speed of 15 m/sec (shear stress, $5 \times 10^4$ kgf/m/sec$^2$ [$4.9 \times 10^5$ N/m/sec$^2$]) and a stirring shaft that has an anchor blade at the center axis thereof and runs at a peripheral speed of 1 m/sec (shear stress, $1 \times 10^4$ kgf/m/sec$^2$ [$9.8 \times 10^4$ N/m/sec$^2$]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete solution. The heating time was 15 minutes. In this stage, the filter, the housing and the pipe line that are exposed to high temperature are all made of Hastelloy alloy of good corrosion resistance; and the system is covered with a jacket for heat carrier circulation therethrough for keeping the system warmed and heated.

Next, this was cooled to 36° C. to obtain a polymer solution.
5) Filtration:

The thus-obtained polymer solution was filtered through a paper filter sheet (#63, by Toyo Filter) having an absolute filtration accuracy of 10 μm, and then through a sintered metal filter sheet (FH025, by Paul) having an absolute filtration accuracy of 2.5 μm to obtain a polymer solution.
(Formation of Film)

The polymer solution was heated at 30° C., passed through a caster, Giesser (described in JP-A-11-314233), and cast onto a mirror-faced stainless support having a band length of 60 m and set at 15° C., at a casting speed of 50 m/min. The casting width was 200 cm. The space temperature in the entire casting zone was set at 15° C. At 50 cm before the endpoint of the casting zone, the polymer film thus cast and rolled was peeled off from the band, and exposed to drying air applied thereto at 45° C. Next, this was dried at 110° C. for 5 minutes and then at 140° C. for 10 minutes to obtain a transparent film of cellulose acylate.

"Tac A" is FUJITAC T80UZ (by Fujifilm), which was purchased and used as it is.
(Heat Treatment)

The obtained film was subjected to heat treatment using an apparatus having a heating zone between two pairs of nip rolls. The length/breadth ratio (distance between two pairs of nip rolls/base width) was adjusted to be 3.3, the heating zone was kept at a temperature as listed in Table 1, and the film was cooled to a temperature as listed in Table 1 after it was conveyed through two pairs of nip rolls. The elongation of the film was obtained according to the following formula in such a manner that gauge lines were given to the film at a constant interval in the direction perpendicular to the transport direction of the film and the interval was measured before and after the heat treatment.

Elongation of film (%)=100×{(interval of gauge lines after heat treatment)−(interval of gauge lines before heat treatment)}/interval of gauge lines before heat treatment (Stretching)

Subsequently, the film after the heat treatment was clipped at both ends thereof with tenter clips, and then stretched in the direction perpendicular to the transport direction in the heating zone. The heating zone was kept at a temperature as listed in table 1. The stretching ratio was obtained according to the following formula in such a manner that the gauge lines were given to the film at a constant interval in the direction parallel to the transport direction of the film and the interval was measured before and after the heat treatment.

Stretching ratio (%)=100×{(interval of gauge lines after stretching)−(interval of gauge lines before stretching)}/interval of gauge lines before stretching (Evaluation of Transparent Polymer Film)

The obtained respective transparent polymer films were evaluated. The results are shown in Table 1 below. Rth after the cooling in Example 102 and Comparative Example 102 was evaluated in in-line operation.

The slow phase axis of Re of the film after the stretching was observed in the direction perpendicular to the transport direction in Examples 101-111 and Comparative Examples 101-103, and in the direction parallel to the transport direction in Comparative Examples 104 and 105. The variation of Re and Rth was at most ±1 nm and at most ±2 nm, respectively, for all the samples, the variation being evaluated on the basis of the above-described method (variation of values measured at five portions).

TABLE 1

| | Film as formed | | | | | | | Heat treatment | | Cooling | | | |
|---|---|---|---|---|---|---|---|---|---|---|---|---|---|
| | Additive composition type | Solvent type | Tg [° C.] | Re Average [nm] | Rth Average [nm] | Thickness [nm] | Moisture permeability [g/m²·day] | Temperature [° C.] | Elongation of film [%] | Temperature [° C.] | (Heat treatment temperature) − (cooling temperature) [° C.] | Rth Average [nm] | Moisture permeability [g/m²·day] |
| Example 101 | A | A | 150 | 2 | 5 | 80 | 990 | 200 | 0 | 25 | 175 | −29 | 770 |
| Example 102 | A | A | 150 | 2 | 5 | 80 | 990 | 200 | 0 | 150 | 50 | −10 | — |
| Example 103 | A | A | 150 | 2 | 5 | 80 | 990 | 220 | 0 | 25 | 195 | −54 | 740 |
| Example 104 | A | A | 150 | 2 | 5 | 80 | 990 | 220 | 0 | 25 | 195 | −54 | 740 |
| Comp Ex 101 | A | A | 150 | 2 | 5 | 80 | 990 | 220 | 0 | 25 | 195 | −54 | 740 |
| Comp Ex 102 | A | A | 150 | 2 | 5 | 80 | 990 | 220 | 0 | 180 | 40 | 30 | — |
| Example 105 | A | A | 150 | 2 | 5 | 80 | 990 | 240 | 0 | 25 | 215 | −68 | 720 |
| Example 106 | A | A | 150 | 2 | 5 | 80 | 990 | 240 | 0 | 25 | 215 | −68 | 720 |
| Comp Ex 103 | A | A | 150 | 2 | 5 | 80 | 990 | 240 | 0 | 25 | 215 | −68 | 720 |
| Example 107 | A | A | 150 | 2 | 5 | 80 | 990 | 240 | 40 | 25 | 215 | −67 | 710 |
| Example 108 | B | A | 140 | 1 | 41 | 78 | 520 | 220 | 0 | 25 | 195 | −29 | 380 |
| Comp Ex 104 | C | A | 132 | 6 | 103 | 80 | 490 | 240 | 40 | 25 | 215 | 46 | 350 |
| Example 109 | (TAC A) | — | 140 | 1 | 48 | 80 | 500 | 220 | 0 | 25 | 195 | −27 | 390 |
| Comp Ex 105 | (TAC A) | — | 140 | 1 | 48 | 80 | 500 | 180 | 0 | 25 | 155 | 32 | 460 |
| Example 110 | A | B | 151 | 2 | 38 | 80 | 960 | 240 | 40 | 25 | 215 | −60 | 690 |
| Example 111 | A | A | 150 | 1 | 38 | 40 | 1680 | 240 | 40 | 25 | 215 | −42 | 1230 |

| | Stretching | | | Evaluation of stretched film | | | | |
|---|---|---|---|---|---|---|---|---|
| | Temperature [° C.] | Stretching ratio [%] | (Heat treatment temperature) − (stretching temperature) [° C.] | Re Average [nm] | Rth Average [nm] | Rth/Re Average [nm] | (Rth after stretching) − (Rth before stretching) [nm] | Moisture permeability [g/m²·day] |

TABLE 1-continued

| | | | | | | | | |
|---|---|---|---|---|---|---|---|---|
| Example 101 | 160 | 10 | 40 | 41 | −3 | −0.07 | 26 | 770 |
| Example 102 | 160 | 10 | 40 | 37 | −1 | −0.03 | 9 | 780 |
| Example 103 | 160 | 20 | 60 | 99 | −10 | −0.10 | 44 | 750 |
| Example 104 | 200 | 20 | 20 | 102 | −23 | −0.23 | 31 | 740 |
| Comp Ex 101 | 240 | 20 | −20 | 105 | −54 | −0.51 | 0 | 730 |
| Comp Ex 102 | 160 | 20 | 60 | 30 | −13 | −0.43 | −43 | 760 |
| Example 105 | 160 | 20 | 80 | 143 | −9 | −0.06 | 59 | 720 |
| Example 106 | 210 | 20 | 30 | 151 | −49 | −0.32 | 19 | 710 |
| Comp Ex 103 | 240 | 20 | 0 | 152 | −68 | −0.45 | 0 | 710 |
| Example 107 | 160 | 20 | 80 | 158 | −13 | −0.08 | 54 | 720 |
| Example 108 | 150 | 20 | 70 | 92 | −3 | −0.03 | 26 | 390 |
| Comp Ex 104 | 142 | 20 | 98 | 4 | 119 | 29.75 | 73 | 360 |
| Example 109 | 150 | 20 | 70 | 90 | −1 | −0.01 | 26 | 400 |
| Comp Ex 105 | 150 | 10 | 30 | 8 | 49 | 6.13 | 17 | 470 |
| Example 110 | 160 | 20 | 80 | 139 | −8 | −0.06 | 52 | 690 |
| Example 111 | 160 | 20 | 80 | 101 | −10 | −0.10 | 32 | 1210 |

As shown in Table 1, according to the method of the invention, a film satisfying all of $Rth/Re \geq -0.39$, $Re>0$ and $Rth<0$, and having optical uniformity could be produced. On the contrary, in the case where a stretching temperature or heat treatment temperature was not suitable, or an additive was not suitable, a film having a targeted retardation could not be produced.

The difference ($Rth_0-Rth_1$) between Rth ($Rth_1$) which was measured for the produced film after being dipped in methanol at 25° C. for subjecting it to ultrasonic extraction for three hours and further dried at 80° C. for 10 minutes, and Rth ($Rth_0$) measured before the methanol treatment was 1 nm for the film to which the additive composition A was added, 5 nm for the film to which the additive composition B was added, 72 nm for the film to which the additive composition C was added, and 6 nm for TAC A.

Comparative Example 106

A cellulose acetate film having a thickness of 50 μm was produced in the same way as in Example 105, which was used to give a birefringent film according to JP-A-5-157911, Example 5. The film had a fluctuation range of as large as 8° in the slow phase axis direction, and such large variation (variation of values measured at five portions) as ±25 nm for Re and ±43 nm for Rth.

Example 201

(Manufacture of Laminated Retardation Film)

The cellulose ester film of the invention can be used directly as the retardation film satisfying all of $Rth/Re \geq -0.39$, $Re>0$ and $Rth<0$, but here, a retardation film having a controlled Rth/Re ratio was manufactured by the sticking of the film using an adhesive in roll-to-roil operation.

FUJITAC T80UZ (manufactured by Fujifilm corporation) and the film in Example 106 were stuck to each other with an adhesive in roll-to-roll operation, which was measured of Re and Rth by the aforementioned method to give Re=150 nm and Rth=0 nm. The slow phase axis of Re of the retardation film was observed in the width direction of the film.

Examples 301-310, Comparative Examples 301-307

(Manufacture of Polarizer Plate)

The obtained film was subjected to saponification treatment, which was used for manufacturing a polarizer.
1) Saponification of Film A film A and film B listed in Table 2 below were dipped in a 1.5 mol/L NaOH aqueous solution (saponification solution) that was temperature-controlled at 55° C. for 2 minutes and then washed with water, which were dipped in a 0.05 mol/L sulfuric acid aqueous solution for 30 seconds and further passed through a water washing bath. Then, the films were subjected to air knife treatment three times to remove water and retained in a drying zone at 70° C. for 15 seconds to be dried, to manufacture saponified films.

2) Manufacture of Polarizing Plate

According to JP-A-2001-141926, Example 1, the film was stretched in a longitudinal direction by giving difference in circumferential velocities to two pairs of nip rolls, to prepare a polarizing layer having a thickness of 20 μm.

3) Sticking

The polarizing layer thus obtained and two films (film A and film B respectively, whose combination in respective Examples and Comparative Examples is listed in Table 2 below) selected from the saponified films were disposed so that the saponified surfaces faced to the polarizing film and sandwiched the polarizing layer, which were then stuck to each other using a 3% PVA (PVA-117H, manufactured by KURARAY Co., Ltd) aqueous solution as an adhesive in such a manner that the polarizing axis crossed perpendicularly to the longer direction of the film.

In Table 2, TAC B is FUJITAC TD80UF (manufactured by Fujifilm corporation; moisture permeability=430 g/(m²·day) at 40° C. and a relative humidity of 90%), polycarbonate is Panlite C1400 (manufactured by TEIJIN CHEMICALS, LTD; moisture permeability=25 g/(m²·day) at 40° C. and a relative humidity of 90%), COP1 is ARTON FILM (thickness: 80 μm, manufactured by JSR corporation; moisture permeability=30 g/(m²·day) at 40° C. and a relative humidity of 90%), and COP2 is ZEONOR FILM (thickness: 100 μm, by ZEON; moisture permeability=0 g/(m²·day) at 40° C. and a relative humidity of 90%).

In Comparative Example 304, the sticking was carried out using a film which had been subjected to surface treatment replaced by corona treatment.

(Evaluation of Polarizing Plate)
[Initial Polarization Degree]

The polarization degree of the polarizer was calculated according to the method described above. The result is listed in Table 2.

[After Storage Polarization Degree 1]

The polarizer was stuck to a glass plate on the film A side thereof with an adhesive, which was left under conditions of 60° C. and a relative humidity of 95% for 500 hours and the polarization degree after the lapse of time (after storage polarization degree) was calculated according to the aforementioned method. The results are listed in Table 2 below.
[After Storage Polarization Degree 2]

The polarizer was stuck to a glass plate on the film A side thereof with an adhesive, which was left under conditions of 90° C. and a relative humidity of 0% for 500 hours and the polarization degree after the lapse of time (after storage polarization degree) was calculated according to the aforementioned method. The results are listed in Table 2 below.

TABLE 2

|  | Film A | Film B | Initial polarizing degree [%] | After storage polarizing degree 1 [%] | After storage polarizing degree 2 [%] |
|---|---|---|---|---|---|
| Example 301 | Example 101 | TAC B | 99.9 | 99.9 | 99.9 |
| Example 302 | Example 102 | TAC B | 99.9 | 99.9 | 99.9 |
| Example 303 | Example 103 | TAC B | 99.9 | 99.9 | 99.9 |
| Example 304 | Example 104 | TAC B | 99.9 | 99.9 | 99.9 |
| Example 305 | Example 105 | TAC B | 99.9 | 99.9 | 99.9 |
| Example 306 | Example 106 | TAC B | 99.9 | 99.9 | 99.9 |
| Example 307 | Example 107 | TAC B | 99.9 | 99.9 | 99.9 |
| Example 308 | Example 108 | TAC B | 99.9 | 99.9 | 99.9 |
| Example 309 | Example 109 | TAC B | 99.9 | 99.9 | 99.9 |
| Example 310 | Example 109 | Example 109 | 99.9 | 99.9 | 99.9 |
| Example 311 | Example 110 | TAC B | 99.9 | 99.9 | 99.9 |
| Example 312 | Example 111 | TAC B | 99.9 | 99.9 | 99.9 |
| Comp Ex 301 | Polycarbonate | Polycarbonate | (Insufficient sticking property; unmeasurable) | | |
| Comp Ex 302 | COP1 | COP1 | (Insufficient sticking property; unmeasurable) | | |
| Comp Ex 303 | COP2 | COP2 | (Insufficient sticking property; unmeasurable) | | |
| Comp Ex 304 | COP2 | COP2 | 99.9 | 99.9 | (Bubble generation) |
| Comp Ex 305 | Comp Ex 101 | TAC B | 99.9 | 99.9 | 99.9 |
| Comp Ex 306 | Comp Ex 103 | TAC B | 99.9 | 99.9 | 99.9 |
| Comp Ex 307 | TAC B | TAC B | 99.9 | 99.9 | 99.9 |

(Implementation Evaluation for IPS Type Liquid Crystal Display Device)

When each of the polarizers in Examples 301, 305 and 307 was set in an IPS type liquid crystal display device (32 V type high vision liquid crystal television monitor (W32-L7000), manufactured by HITACHI, LTD) in place of a polarizer having been set in the monitor, viewing angle properties were improved, and further display unevenness was also bettered. On the contrary, when each of polarizers in Comparative Examples 304-307 was set, the viewing angle properties were either not improved or insufficiently improved, if any.

Industrial Applicability

According to the present invention, it is possible to provide a transparent polymer film having suitable moisture permeability and satisfying all of Rth/Re≧−0.39, Re>0, Rth<0, and to provide an excellent retardation film. The transparent polymer film of the invention has suitable moisture permeability, therefore it can be stuck to a polarizing film in on-line operation, to allow polarizers excellent in visibility to be provided in high productivity. Further, it can provide liquid crystal display devices having high reliability. Consequently, the invention has high industrial applicability.

The invention claimed is:

1. A method for producing a transparent polymer film comprising stretching a polymer film having Rth<0 to result in ΔRth>0 and to obtain a transparent polymer film satisfying Rth<0, Re>0 and Rth/Re≧−0.39:

$\Delta Rth = [Rth\ \text{after stretching}] - [Rth\ \text{before stretching}]$ wherein Rth is a retardation (unit: nm) in the thickness direction,
wherein the stretching is carried out, after heat-treating the polymer film at a temperature of at least (Tg+50)° C. and then cooling it, at the cooling temperature or a higher temperature in which the Tg is the glass transition temperature of the polymer film.

2. The method for producing a transparent polymer film according to claim 1, wherein the polymer film after the stretching has a moisture permeability of at least 100 g/(m²·day) at 40° C. and a relative humidity of 90%.

3. The method for producing a transparent polymer film according to claim 1, wherein the polymer film is a cellulose acylate film.

4. The method for producing a transparent polymer film according to claim 3, wherein the stretching is carried out, after heat-treating the film at 200° C. or a higher temperature and then cooling it, at the cooling temperature or a higher temperature.

5. The method for producing a transparent polymer film according to claim 1, wherein the difference between the heat treatment temperature and the stretching temperature is at least 1° C.

6. The method for producing a transparent polymer film according to claim 1, wherein the stretching temperature is lower than the heat treatment temperature.

7. The method for producing a transparent polymer film according to claim 1, wherein the heat treatment is a heat treatment that is carried out between two or more apparatuses holding the film in a transport direction with heating.

8. The method for producing a transparent polymer film according to claim 1, wherein the cooling temperature is lower than the heat treatment temperature by at least 50° C.

9. The method for producing a transparent polymer film according to claim 1, wherein the film before the heat treatment has −1000 ≦Rth <50 in which Rth is a thickness-direction retardation (unit: nm).

10. The method for producing a transparent polymer film according to claim 1, wherein the stretching is a tenter stretching.

* * * * *